United States Patent
Jammoussi et al.

(10) Patent No.: US 10,121,367 B2
(45) Date of Patent: Nov. 6, 2018

(54) VEHICLE LANE MAP ESTIMATION

(71) Applicant: Ford Global Technologies, LLC, Dearborn, MI (US)

(72) Inventors: Hassene Jammoussi, Canton, MI (US); Pankaj Kumar, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 203 days.

(21) Appl. No.: 15/142,183

(22) Filed: Apr. 29, 2016

(65) Prior Publication Data
US 2017/0316684 A1    Nov. 2, 2017

(51) Int. Cl.
| | |
|---|---|
| G08G 1/01 | (2006.01) |
| G01C 21/36 | (2006.01) |
| G08G 1/0967 | (2006.01) |
| G06T 11/60 | (2006.01) |
| B60W 30/09 | (2012.01) |
| G01C 21/30 | (2006.01) |

(52) U.S. Cl.
CPC ........... *G08G 1/0112* (2013.01); *B60W 30/09* (2013.01); *G01C 21/30* (2013.01); *G01C 21/3602* (2013.01); *G06T 11/60* (2013.01); *G08G 1/0125* (2013.01); *G08G 1/0129* (2013.01); *G08G 1/0141* (2013.01); *G08G 1/096716* (2013.01); *G08G 1/096725* (2013.01); *G08G 1/096775* (2013.01)

(58) Field of Classification Search
None
See application file for complete search history.

(56) References Cited

U.S. PATENT DOCUMENTS

| | | | |
|---|---|---|---|
| 6,385,539 B1 * | 5/2002 | Wilson | G01C 21/30 340/905 |
| 8,258,980 B2 | 9/2012 | Becker | |
| 8,483,903 B2 | 7/2013 | Tengler et al. | |
| 8,880,272 B1 * | 11/2014 | Ferguson | G05D 1/0212 701/23 |
| 8,884,782 B2 | 11/2014 | Rubin et al. | |
| 9,079,587 B1 | 7/2015 | Rup et al. | |
| 9,487,212 B1 | 11/2016 | Adam et al. | |
| 2003/0195703 A1 * | 10/2003 | Ibrahim | B60K 31/0008 701/301 |
| 2007/0032245 A1 | 2/2007 | Alapuranen | |
| 2012/0314070 A1 | 12/2012 | Zhang et al. | |
| 2014/0257686 A1 | 9/2014 | Feldman et al. | |
| 2014/0358321 A1 | 12/2014 | Ibrahim | |
| 2014/0358420 A1 | 12/2014 | Noh | |
| 2015/0339927 A1 | 11/2015 | Han et al. | |

FOREIGN PATENT DOCUMENTS

EP    2075170 A1    7/2009

OTHER PUBLICATIONS

UK Search Report dated Aug. 23, 2017 re GB1706820.6.

* cited by examiner

Primary Examiner — Jelani A Smith
Assistant Examiner — Kelly D Williams
(74) Attorney, Agent, or Firm — Frank A. MacKenzie; Bejin Bieneman PLC

(57) ABSTRACT

A computer can receive, from a vehicle sensor, data about a plurality of second vehicles, define two or more vehicle clusters based on location data of second vehicles, each cluster including two or more of the second vehicles determined to be traveling in a same lane, identify two or more lane boundaries according to clusters, and use lane boundaries to generate a lane map.

17 Claims, 5 Drawing Sheets

VEHICLE LANE MAP ESTIMATION

BACKGROUND

Sensors are used in vehicles to detect road features, e.g., lane markings. These sensors may assist an operator to improve driving safety, e.g., avoiding an unintended lane change. Alternatively, in a semi-autonomous or in an autonomous vehicle with limited monitoring or without monitoring of operation of the vehicle by occupants of the vehicle, these sensors may be used to determine location of lane markings relative to the vehicle on the road. However, vehicle sensors do not always provide adequate data to identify lane markings, e.g., because of sensor faults, environmental conditions, etc.

DETAILED DESCRIPTION

Introduction

Figure 1:
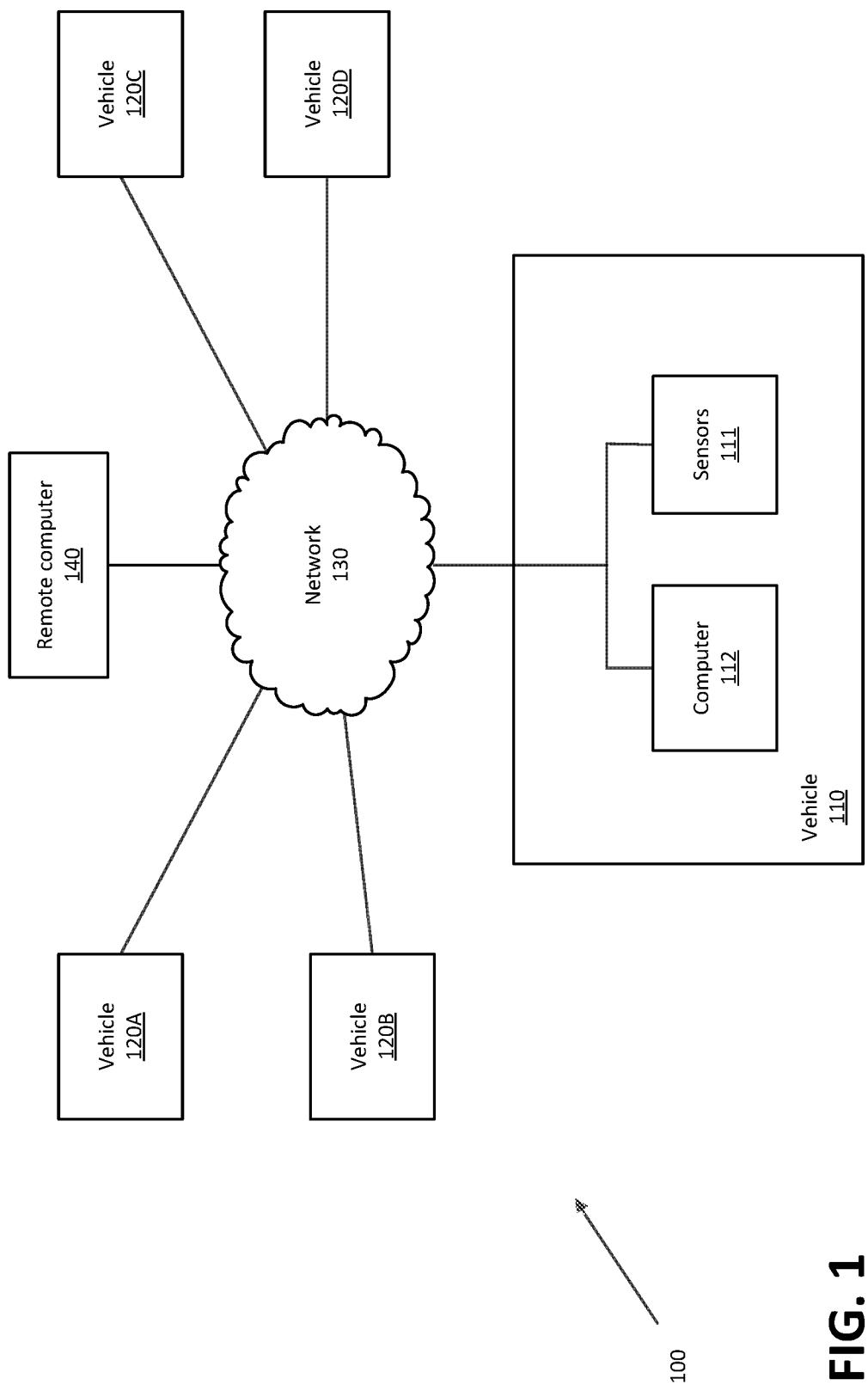
FIG. 1 is a block diagram of an exemplary system to identify lane markings for a first vehicle.

FIG. 1 illustrates an exemplary lane-identification system 100. A computer 112 in a first vehicle 110 (sometimes referred to for convenience as a "host" vehicle 110) comprises a processor and a memory, the memory storing instructions such that the processor is programmed for various operations, including as described herein. For example, the computer 112 can receive, from a vehicle sensor 111, data about a plurality of second vehicles 120, define two or more vehicle clusters L1, L2, L3 (see FIG. 2) based on location data of second vehicles 120, each cluster including two or more of the second vehicles 120 determined to be traveling in a same lane, identify two or more lane boundaries 201, 202, 203 according to clusters L1, L2, L3, and use lane boundaries 201, 202, 203 to generate a lane map.

The lane map describes respective positions of the lane boundaries 201, 202, 203 either relative to a location $C_0$ of the vehicle 110 or based on geolocation coordinates like GPS latitude and longitude coordinates. The lane map may include multiple discrete points representing an estimated location of a lane boundary, e.g. the boundary 201. Further, a curve fitting technique can be used to fit a curve between the multiple discrete points, e.g. a Bezier curve fitting formula. The lane map may be used to warn an operator of the vehicle 110 about an unintended lane change, navigate a vehicle in a lane without operator monitoring, or provide this information of the lane map to other vehicles, e.g., through a vehicle-to-vehicle communication interface.

Exemplary System Elements

The vehicle 110 includes the computer 112 that generally includes the processor and the memory, the memory including one or more forms of computer-readable media, and storing instructions executable by the processor for performing various operations, including as disclosed herein. For example, the computer 112 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computer 112, as opposed to a human operator, is to control such operations. Further, the computer 112 may include programming to determine one or more lane boundaries and to receive data relating to determining one or more lane boundaries, and/or to receive a lane boundary determination, from other vehicles 120 (i.e., from computers therein) and/or a remote computer 140.

The computer 112 may include or be communicatively coupled to one or more wired or wireless communications networks, e.g., via a vehicle communications bus, Ethernet, etc. Via a vehicle communication network, the computer 112 may send and receive data to and from controllers or the like included in the vehicle 110 for monitoring and/or controlling various vehicle components, e.g., electronic control units (ECUs). As is known, an ECU can include a processor and a memory and can provide instructions to actuators to control various vehicle 110 components, e.g., ECUs can include a powertrain ECU, a brake ECU, etc. In general, the computer 112 may transmit messages to various devices in the vehicle 110 and/or receive messages from the various devices, e.g., controllers, actuators, sensors, etc., including sensors 111. Alternatively or additionally, in cases where the computer 112 actually comprises multiple devices, the vehicle communication bus may be used for communications between devices represented as the computer 112 in this disclosure.

In addition, the computer 112 may be configured for communicating with a remote computer 140, e.g. a cloud server, via a network 130, which may utilize various wired and/or wireless networking technologies, e.g., cellular, BLUETOOTH®, wired and/or wireless packet networks, etc.

Referring to FIG. 1, sensors 111 may include a variety of devices known to provide data to the computer 112. For example, a radar fixed to a front bumper (not shown) of the vehicle 110 may provide locations of the second vehicles 120 travelling in front of the vehicle 110, relative to the location of the vehicle 110. As another example, the sensors 111 may include a global positioning system (GPS) sensor disposed in the vehicle 110 that provides geographical coordinates or geolocation of the vehicle 110. As another example, the sensors 111 may include a Light Detection And Ranging (LIDAR) sensor disposed on a top of the vehicle 110 that provides relative locations, sizes, and shapes of the second vehicles 120 surrounding the vehicle 110, including the second vehicles 120 travelling next to or behind the vehicle 110. The sensors 111 may include a camera, e.g. a front facing camera providing images from a forward direction of the vehicle 110. A computing device, e.g., the computer 112, may be programmed to receive image data from the camera, implement image processing techniques to detect the lane markings 201, 2020, 203, and create the lane map. The camera may provide an image or images of one or more objects, for example, the front facing camera may detect the second vehicles 120 in front of vehicle 110. Based on camera images, the computer 112 may determine a relative distance of the vehicle 110 from one of more lane markings adjacent the vehicle 110, e.g., with reference to FIG. 2, the distances $DR_0/DL_0$ from the center $C_0$ of the vehicle 110 to the lane marking 203/202 on a right/left side of the vehicle 110.

Data provided from different sensors 111 may have different properties, range, accuracy, and failure conditions. For example, radar and LIDAR can provide distance to objects, e.g., one or more second vehicles 120. A radar can work in even when environmental conditions are poor for visual sensing, e.g. fog, heavy precipitation, etc., and depending on a type of radar may have a long range, e.g., 250 meters from the vehicle 110. A camera may provide information like type of the object, e.g., lane markings 201, 202, 203, which cannot be provided by the radar or the LIDAR. On the other hand, a camera may fully or partially fail to provide information in bad environmental conditions, e.g., rain, fog, etc. For example, when a road is snow-covered, a camera may detect locations of the second vehicles 120 but not lane markings 201, 202, 203.

The second vehicles 120 may include sensors such as radar, GPS sensor, LIDAR sensors etc., and may provide data to computing devices in respective second vehicles 120. The second vehicles 120 may include vehicle-to-vehicle communication interfaces such as are known that provide sensor data and/or other second vehicle 120 data to the host vehicle 110. Additionally or alternatively, a second vehicle 120 could provide second vehicle 120 data to a remote computer 140 via a network 130. The host vehicle 110 may receive second vehicle 120 data from the remote computer 140. For example, the second vehicles 120 may include cameras operable to detect lane markings 201, 202, and 203. The cameras of the second vehicles 120 may be operable to determine distances from the second vehicles 120 to adjacent lane markings of the second vehicles 120, e.g., the distances DR/DL from the center C of the second vehicle 120B to the lane marking 203/202 on a right/left side of the second vehicle 120B. As stated above, the distances DL and/or DR from the center C of the second vehicle 120B may be sent to the vehicle 110 or the remote computer 140 through a wireless interface of the second vehicle 120B.

Figure 2:
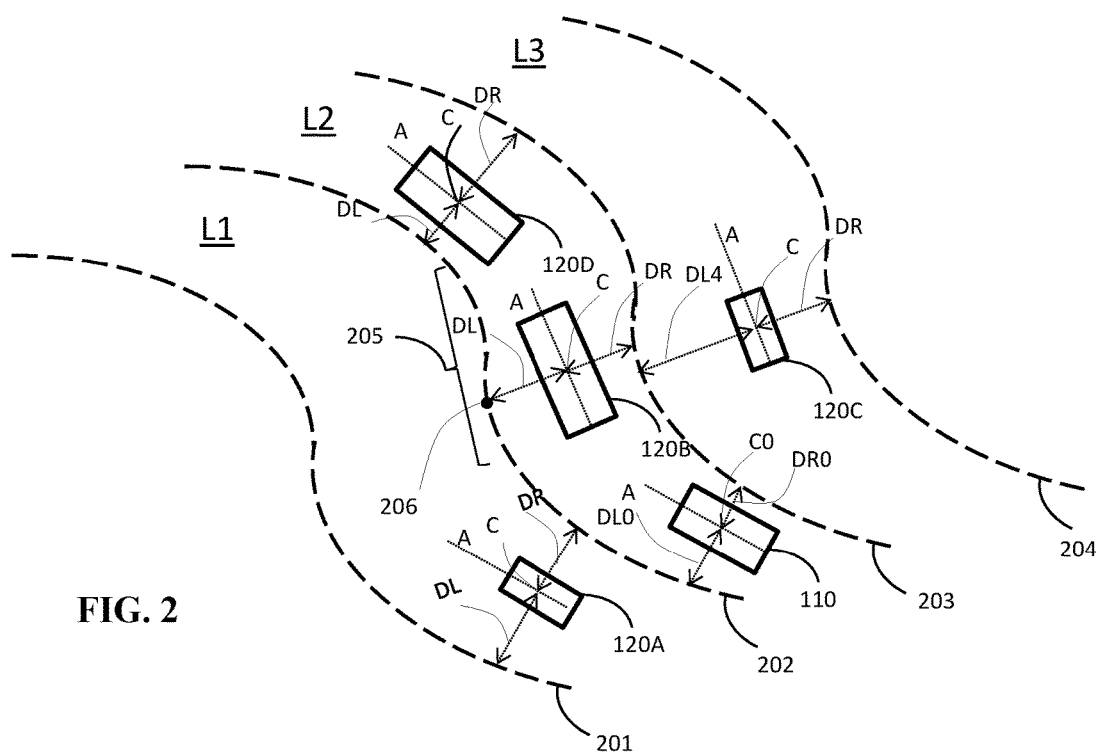
FIG. 2 is a diagram showing multiple vehicles in multiple lanes in the context of the system of FIG. 1.

FIG. 2 illustrates the host vehicle 110 and the second vehicles 120 travelling in clusters L1, L2, and L3, separated by lane boundaries 202 and 203. The lane boundaries may be curved or straight lines.

Multiple vehicles travelling between the same two lane boundaries may be in a same cluster, e.g., the host vehicle 110, the second vehicle 120B, and the second vehicles 120D are in the cluster L2.

As described further below, the lane boundaries may be represented by a fitted curve or a fitted line between multiple discrete points on the lane boundary. The lane map includes the information of a plurality of lane boundaries, e.g. 201, 202, and 203.

Geolocations of a lane boundary or geolocations of discrete points representing a lane boundary may be defined relative to the center $C_0$ of the host vehicle 110, e.g., when a camera in the host vehicle 110 includes a processor programmed to detect the lane markings 201, 202, 203.

As stated above, the sensors 111, e.g. a camera of the host vehicle 110, may fully or partially fail to provide usable image data for various reasons, e.g., bad environmental conditions like rain, fog, etc., or obstacles like other vehicles. For example, as illustrated in FIG. 2, a second vehicle 120B could limit a field of view of a camera in the host vehicle 110. With such a limited view, the camera in the vehicle 110 may not obtain an image of a section 205 of the lane boundary 202.

As another example, geolocations of a lane boundary or geolocation of discrete points representing a lane boundary may be defined based on GPS geolocations, e.g., determined by GPS sensors of the second vehicles 120 and communicated via the network 130. Based on the geolocations of the second vehicles, a cluster path between the centers of vehicles in a cluster may be determined, e.g., a cluster path for the cluster L2 may be a fitted curve between the center $C_0$ of the host vehicle 110, the center C of the second vehicle 120B, and the center C of the second vehicle 120D. Lane boundaries separating the adjacent cluster paths may be determined to be between the two adjacent cluster paths, for example in the middle, e.g., the lane boundary 202 may be a curve between the cluster paths of the cluster L1 and L2. Alternatively or additionally, the second vehicles 120 may send the distances of their centers to the adjacent lane boundaries to the host vehicle 110, e.g., the host vehicle may receive information indicating a distance DL of the second vehicle 120B from the lane boundary 202. In such a configuration, a geolocation of a discrete point on the lane boundary 202 may be determined, instead of assuming the lane boundary 202 is in the middle of the cluster paths of L1 and L2.

Processes

Figure 3:
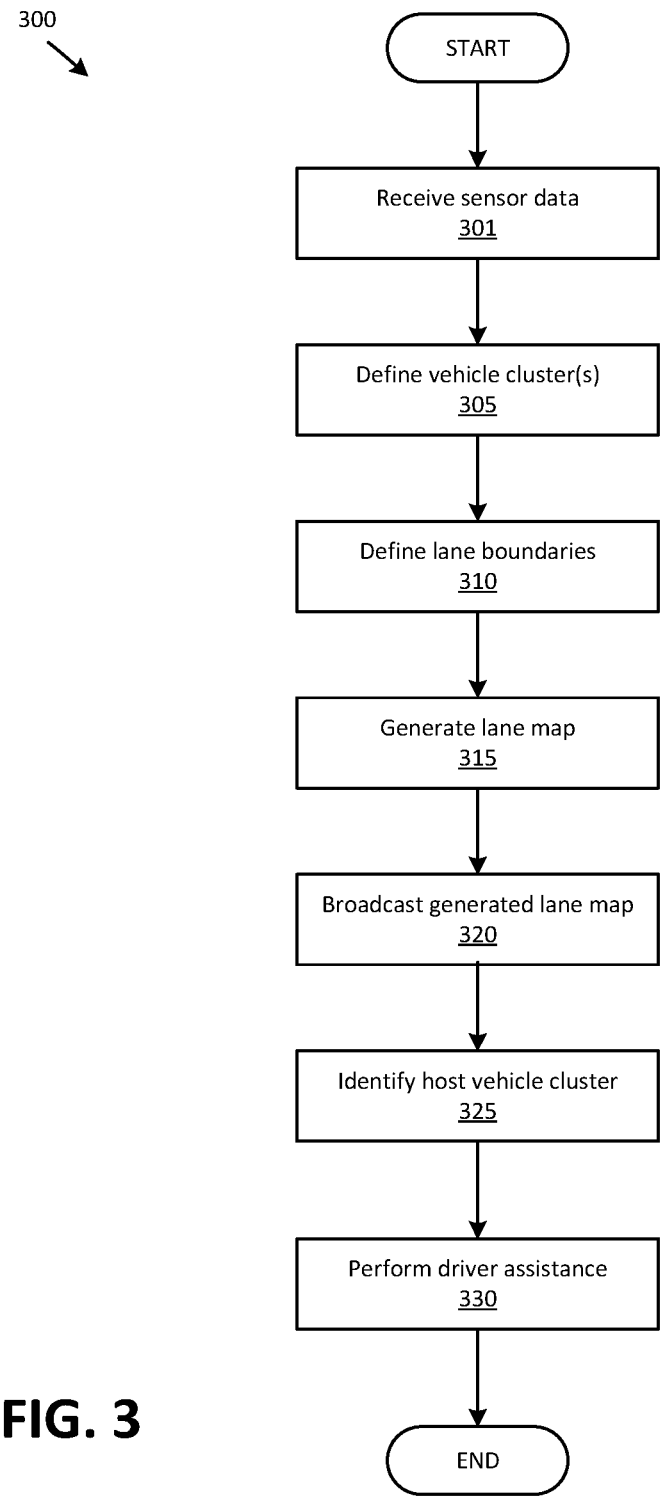
FIG. 3 is a flowchart of an exemplary process for creating a lane map.

FIG. 3 illustrates an example process 300 for creating a lane map in the system of FIG. 1.

The process 300 begins in a block 301, in which the computer 112 receives sensor data. As discussed above, such data may include data received from the remote computer 140, the second vehicles 120, and/or sensor data received from sensors 111 included in the vehicle 110.

Second vehicle 120 sensor data may include respective locations of each second vehicle 120, e.g. geolocations determined by GPS sensors in the second vehicles 120, lateral distance of the second vehicles 120 from adjacent lane boundaries, e.g. the distance DL of the second vehicle 120B from the lane boundary 202, yaw angle of the second vehicles 120, lane maps generated by computers in the second vehicles 120. Data received from the remote computer 140 may include data regarding road and/or environmental conditions, e.g., a lane closure or narrow lane due to construction, traffic conditions, police deployment on a side of the road, temporary change of number of lanes, precipitation likely to reduce road friction, affect visibility, etc. Additionally or alternatively, the data received from the remote computer 140 may include data, which are received by the remote computer 140 from the second vehicles 120.

Sensor 111 data may include geolocation of the vehicle 110, e.g. from a GPS sensor is included in the vehicle 110. Further, vehicle 110 sensor 111 data may be used to determine locations of respective second vehicles 120 relative to the vehicle 110, e.g. a LIDAR in the vehicle 110 may measure relative distances of the second vehicles 120 within a predetermined distance from the vehicle 110. A LIDAR may illuminate the second vehicles 120 with a laser light and calculate distance from the LIDAR to the second vehicles 120 by measuring time for a laser signal to return. Alternatively or additionally, image data from a camera in the vehicle 110 may be used to measure a relative distance to the second vehicles 120. As an example, a computing device receiving image data from a stereo camera may calculate the distance to a second vehicle 120 using known triangulation techniques. Alternatively, a computing device receiving image data from a mono camera may calculate distance to a second vehicle 120 using, for example, projected height techniques. In a projected height technique, a computing device may detect the object and estimate an actual size of the object, measure the number of pixels in the received image data, estimate the distance to the object based on known calibration parameters of the camera, e.g. focal point, etc. A yaw angle of the vehicle 110, e.g., computed based on a yaw rate received from a yaw rate sensor in a vehicle, may also be used.

Next, in a block 305, the computer 112 defines vehicle 120 clusters based on the received data at the block 301, each cluster including two or more second vehicles 120 determined to be traveling in a same lane. Cluster definition, may include data received from the sensors 111 within the vehicles, and/or the data received via the network 130. A process 400 for defining vehicle clusters is described below with respect to FIG. 4.

Next, in a block 310, the computer 112 identifies lane boundaries, such as boundaries 201, 202, 203, and 204 illustrated in FIG. 2. Such identification of lane boundaries may take into account cluster data and sensor data received from the second vehicles 120. A process 500 is described below with respect to FIG. 5 for identifying lane boundaries.

Next, in a block 315, the computer 112 generates the lane map describing the position of the lane boundaries, e.g., 201, 202, 203, and 204. As stated above, the lane map may be based on relative location data, e.g., relative location of the lane boundaries from the center $C_0$ of the vehicle 110. Alternatively or additionally, a lane map may be based on geolocation coordinates, i.e., the lane boundaries can be specified by GPS coordinates. A lane map may further include confidence data for each section of a lane boundary, e.g., depending on a confidence parameter based on the sensor data used to estimate the lane boundaries.

In the block 315, the computer 112 may take into account data indicating updates regarding infrastructure into account, e.g., a blocked lane may be removed from the lane map, or a position of a lane boundary may change when a change in lane width has been enforced by the infrastructure in a construction zone.

In the block 315, the computer 112 may take a received lane map from a second vehicle 120 into account, e.g., a difference between a lane boundary based on calculations in the computer 112 versus the received lane map from a second computer may be considered in determining a confidence level for the lane, e.g. a difference more than a predetermined value may reduce the confidence in an accuracy of lane map calculated by the computer 112.

Next, in a block 320, the computer 112 may broadcast an updated lane map through the network 130 for receipt by one or more vehicles 120 and/or the remote server 140.

Next, in a block 325, the computer 112 may identify a cluster in which the host vehicle 110 is travelling. Such a determination may take into account the lane map and at least one of relative distance of the vehicle 110 to one or more second vehicles 120, geolocation of the vehicle 110 relative to the lane map, and yaw angle of the vehicle 110. For examples, the block 325 may include comparing a geolocation of the host vehicle 110 to each respective lane boundary of the lane map, identify two adjacent lane boundaries between which the geolocation of the host vehicle 110 is positioned, and assign the vehicle 110 to the identified lane.

Next, in a block 330, the computer 112 may cause actuation of one or more vehicle 110 components, e.g., by sending an instruction to one or more vehicle 110 ECUs to control one or more of vehicle 110 steering, propulsion, and/or braking. Such actuation may be based on the lane map generated as described with respect to the block 325 and/or vehicle 110 data, e.g. a geolocation of the vehicle 110 that can be compared to geolocations specified by the lane map. In another example, the block 330 may include actuating a lane departure warning. The lane departure warning may warn a driver of the vehicle 110 when the vehicle 110 is about to make an unintended lane change, i.e., the vehicle 110 is approaching a lane boundary and the vehicle 110 turn signal is off. A lane departure warning can include actuating a haptic output of a steering wheel, providing an audible warning etc. Additionally or alternatively, the block 330 may include lane keeping assistance that includes actuating one or more of steering, propulsion, and braking to maintain the vehicle 110 in a lane, i.e., between two specific lane boundaries, e.g., the boundaries 202, 203. Lane keeping assistance may be implemented in form of a control loop, e.g., a proportional integral derivative (PID), taking sensor data from the vehicle 110 as input, e.g., identified cluster L2 of the vehicle 110, and distance DL and DR of the vehicle 110 from adjacent lane boundaries 202 and 203, and actuate an ECU of the vehicle 110, e.g., a steering controller. The lane keeping assistance may keep the vehicle 110 in the middle of the lane L2, i.e. keeping DL equal to DR, which is sometime referred to as lane centering function.

Following the block 330, the process 300 ends.

Figure 4:
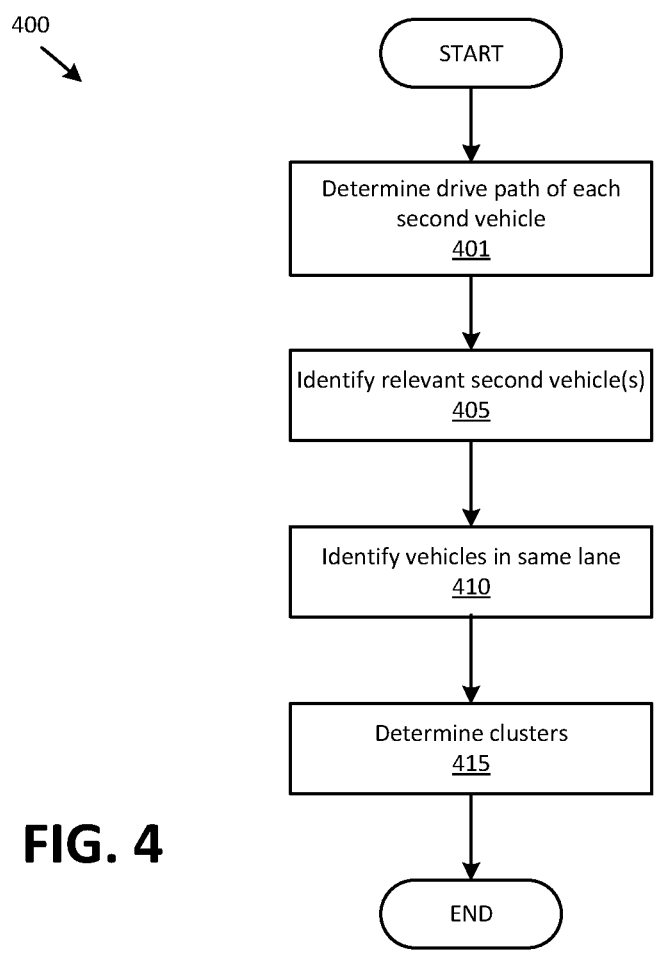
FIG. 4 is a flowchart of an exemplary process for defining vehicle clusters.

FIG. 4 illustrates the details of an exemplary process 400 for defining vehicle cluster(s), e.g., as mentioned above concerning the block 305 of the process 300.

The process 400 begins with a block 401, in which the computer 112 in an iterative action determines a drive path of each second vehicle 120. The determination of a drive path for a second vehicle 120 may include using known techniques to interpolate between multiple locations of a respective second vehicle 120.

Next, in a block 405, the computer 112 identifies relevant second vehicles 120 for defining vehicle cluster(s), e.g., a second vehicle 120 with a lateral acceleration greater than a predetermined threshold may be determined to be changing lanes and therefore not useful for cluster definition.

Next, in a block 410, the computer 112 may identify vehicles 120 in a same lane, e.g. by comparing drive paths of relevant second vehicles 120 determined in the block 405, e.g. using known techniques such as supervised learning techniques such as support vector machine, neural network or regression analysis, unsupervised learning techniques such as clustering, or other forecasting models. Supervised learning and unsupervised learning include various known types of machine learning tasks. Supervised learning is a machine learning task of inferring a function from labeled training data. Unsupervised learning is a machine learning task of inferring a function to describe hidden structure from unlabeled data. As another example, a statistical model may take drive path of each relevant second vehicle 120, and iteratively compare to drive paths of other relevant second vehicles 120 to identify the relevant second vehicles 120, which follow one another substantially on the same drive path.

Next, in a block 415, the computer 112 generates vehicle 120 clusters. One or more second vehicles 120 identified by the block 410 as travelling in a same lane is referred to as a vehicle cluster. When multiple lanes are available for driving, then multiple vehicle clusters may be identified. The block 415 may include identifying data for vehicle clusters, e.g., the computer 112 may include programming to fit a curve between centers C of selected second vehicles 120 determined in the block 410 to drive in a same lane, e.g., a polynomial of third degree such as $Y=aX+bX^2+cX^3$ may be used to represent the vehicle cluster. Y and X represent longitudinal and lateral coordinates. Parameters a, b, and c of such a polynomial may determine a lane curvature for the lane, in which the respected cluster of vehicles travel. Additionally, a yaw angle of a leading second vehicle 120 of a vehicle cluster, i.e., determined to be in front of a vehicle cluster, may have a more significant value in estimating or extrapolating the curvature of an upcoming section of a lane.

Following the block 415, the process 400 ends.

Figure 5:
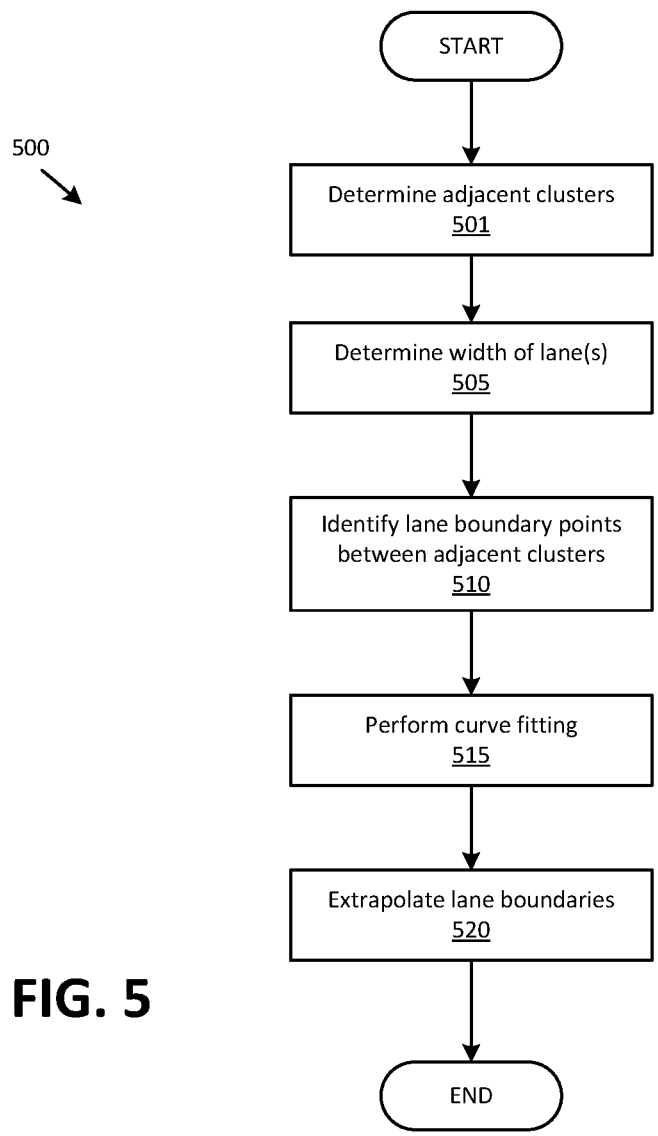
FIG. 5 is a flowchart of an exemplary process for identifying lane boundaries.

FIG. 5 illustrates an exemplary process 500 for defining lane boundaries, e.g. as mentioned above concerning the block 310 of the process 300.

The process begins with a block 501, in which the computer 112 identifies adjacent vehicle clusters. "Adjacent vehicle cluster," as that term is used herein, refers to two clusters of vehicles having only one lane boundary in between them, e.g., the illustrated lanes L1 and L2 have only the lane boundary 202 in between them. Such identification may be an iterative process to sort the vehicle clusters, e.g., by computing the polynomials of all vehicle clusters.

Next, in a block 505, which the computer 112 may estimate width of lane(s), i.e., width of a lane in which a respective cluster of second vehicles 120 travel. In one embodiment, estimation of lane width may include computing an average distance between the curves fitted between the centers C of second vehicles 120 two adjacent cluster paths. Such estimation may be dependent on an assumption that vehicles in a cluster drive on average substantially in a middle of the respective lane, e.g., a center C of second vehicles is assumed to be within a 5% deviation from a center of the respective lane. In another example, an estimation of a lane width may depend on distances DL and DR of the second vehicles, when the second vehicles 120 provide the distances DL and DR. Alternatively, the second vehicles 120 may provide lane width estimation, e.g., from lane marking detecting sensors in second vehicles 120. The block 415 may further take into account infrastructure data form the server 130, e.g., as described above concerning road and/or environmental conditions, road layout, etc. As an example, road layout data such as a change in number of lanes, or lane width may be taken into account for defining vehicle clusters.

Next, in a block 510, the computer 112, identifies a plurality of points on each lane boundary between adjacent vehicle clusters. For example, to identify the lane boundary 202 between vehicle clusters L1 and L2, multiple points forming the lane boundary 202 are identified in the block 510. Such identification may be based, as stated above, on an assumption that the second vehicles 120 travel substantially in middle of lanes. In this case, multiple points in the middle of respective cluster paths of L1 and L2 may be included on the lane boundary 202. Alternatively, second vehicle 120 sensor data may include distances DL and/or DR from lane boundaries, i.e. a marking of lanes of travel of second vehicles 120. In such a configuration, in the block 510, the computer 112 estimates points on lane boundaries using the distances DL and/or DR of second vehicles 120, e.g., point 206 in FIG. 2 on the lane boundary 202 may be identified based on sensor data DL of the second vehicle 120B on the vehicle cluster L2.

Next, in a block 515, the computer 112 fits a curve between multiple points identified in the block 510 on a respective lane boundary. Next, in a block 520, the fitted curve of a respective lane boundary may be extrapolated based on sensor data, e.g., yaw rate, from second vehicles in vehicle clusters enclosing the respective lane boundaries, e.g., the lane boundary 202 may be extrapolated based on yaw rate data of second vehicles on the vehicle clusters L1 and L2, especially based on sensor data from lead vehicles of vehicle clusters L1 and L2. Lead vehicles are the second vehicles 120 in front of a vehicle cluster and more likely first vehicles of a vehicle cluster reacting to a change in lane curvature of the lane in which the vehicle cluster is travelling.

Following the block 520, the process 500 ends.

Computers such as discussed herein generally each include instructions executable by one or more computers such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in stored in a computer is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
    receiving data, in a first vehicle from each of a plurality of second vehicles, including: a respective second vehicle geolocation and a second vehicle lateral distance from a lane boundary;
    defining two or more vehicle clusters based on the received data, each cluster including two or more second vehicles determined to be traveling in a same lane;
    using the defined two or more vehicle clusters, to identify two or more lane boundaries based at least in part on the received respective second vehicle lateral distance from the lane boundary; and
    using the identified two or more lane boundaries to generate a lane map.

2. The method of claim 1, wherein defining two or more vehicle clusters further includes:
    determining a lane width based on distances of the second vehicles from one another; and
    assigning, to a cluster, second vehicles determined to be traveling in a same lane based on the distances of the second vehicles from one another.

3. The method of claim 2, wherein defining two or more vehicle clusters further includes determining a lane curvature.

4. The method of claim 3, wherein determining the lane curvature includes fitting a curve to a plurality of travelled locations of a second vehicle.

5. The method of claim 3, wherein determining the lane curvature is at least based on a statistical forecast of the lane curvature.

6. The method of claim 3, further comprising receiving a yaw angle of the first vehicle, wherein determining the lane curvature is based at least in part on the yaw angle of the first vehicle.

7. The method of claim 2, further comprising:
    receiving a geolocation of the first vehicle; and
    determining a vehicle cluster that includes the first vehicle.

8. The method of claim 2, further comprising:
    generating an updated lane map based on updated vehicle clusters; and
    broadcasting the updated lane map to a stationary server.

9. The method of claim 8, wherein generating the updated lane map includes at least one of changing a lane width and changing a number of lanes.

10. The method of claim 8, wherein defining the vehicle clusters is further based on traffic data.

11. The method of claim 8, wherein defining the vehicle clusters is further based on road construction data.

12. A system comprising a computer including a processor and a memory, the memory storing instructions such that the processor is programmed to:
    receive, from a vehicle sensor, data about a plurality of second vehicles;
    define two or more vehicle clusters based on location data, each cluster including two or more of the second vehicles determined to be traveling in a same lane;
    identify two or more lane boundaries, based at least in part on a received respective second vehicle lateral distance from a lane boundary, according to the defined two or more vehicle clusters; and
    using the identified two or more lane boundaries to generate a lane map.

13. The system of claim 12, wherein defining two or more vehicle clusters further includes:
    determining a lane width based on distances of the second vehicles from one another; and
    assigning, to a cluster, second vehicles determined to be traveling in a same lane based on the distances of the second vehicles from one another.

14. The system of claim 12, wherein defining two or more vehicle clusters further includes determining a lane curvature.

15. The system of claim 14, wherein determining the lane curvature includes fitting a curve to a plurality of travelled locations of a second vehicle.

16. The system of claim 14, wherein determining the lane curvature is at least based on a statistical forecast of the lane curvature.

17. The system of claim 14, further comprising a yaw rate sensor operable to determine a yaw angle of a vehicle, wherein determining the lane curvature is based at least in part on the yaw angle of the vehicle.

* * * * *